Patented Aug. 8, 1933

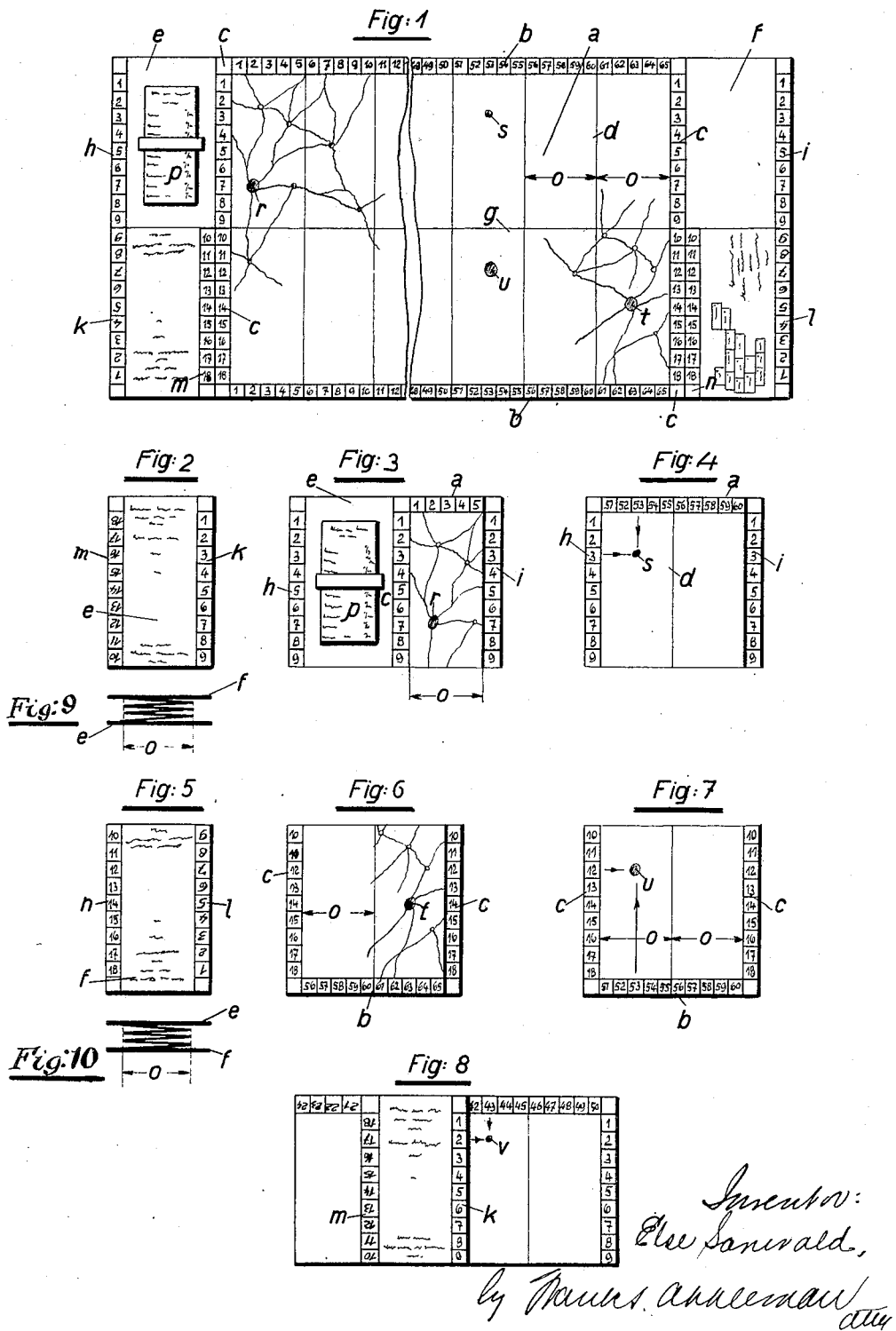

1,921,332

UNITED STATES PATENT OFFICE 1,921,332

ZIGZAG FOLDING MAP

Else Sanwald, Pasing, near Munich, Germany

Application July 15, 1932, Serial No. 622,714, and in Germany January 9, 1928

2 Claims. (Cl. 283—35)

I have filed an application in Germany on January 9th, 1928.

The present invention refers to a folding map, for instance a town map, motor or cycling map and the like, which permits any desired place or point on the map to be rapidly and easily located. For this purpose zig-zag folding maps with index marks on the edges or margins and provided with protective covers have been suggested, in which the protective covers are hinged or joined together on one side, so that they can be opened like the covers of a book, or else these protective covers are quite separate and attached to each end of the map. These maps, which form a part of the prior art, permit the rapid and easy location of a point on the map only when this point is situated on the first or last fold of the map; in order to find a point situated on the middle portion of the map, the latter must be entirely opened or spread out, because otherwise the lateral index marks will not be visible, being covered up by the folds of the map. Indoors and with a table at one's disposal, this spreading out of the map presents no difficulties, but out of doors and especially in wet or windy weather, spreading out of a map always becomes a very troublesome affair. And in a crowded motor car it is practically an impossibility to open out a map of this kind.

The map according to the present invention eliminates these disadvantages by providing index marks also on the inside of the two covers and by making these covers so wide that said index marks are not covered up by the folds of the map when the latter is folded together. The map may consist of one long strip folding up in zig-zag fashion, without a fold at right angles to the zig-zag folds, or it may be folded once (but not more than once) at right angles to the zig-zag folds.

In the accompanying drawing one form of execution of the map according to the present invention is shown by way of example, Fig. 1 showing the map entirely spread out and Figs. 2 to 8 the map folded during use. Figure 9 illustrates a cross section of the map folded with one face upward. Figure 10 illustrates a cross section of the map folded, in inverted position as compared with Figure 9.

The map proper $a$ is provided at its upper and lower edges with horizontal rows of index numbers, letters, or similar marks $b$ and at its sides with vertical columns of index numbers or other marks $c$. The map can be folded zig-zag fashion along the vertical creases $d$ and also along the horizontal crease $g$ at right angles to the zigzag folds. The two covers $e$, $f$ are attached to the ends of the map so that they form a continuation of the latter. The upper halves of these covers $e$, $f$ are provided on their outside margins with vertical columns of index numbers $h$, $i$ and the lower halves with similar columns $k$, $l$; the lower halves of the covers may advantageously be also provided with auxiliary vertical columns of index numbers $m$ and $n$ on the inner margins.

The covers $e$ and $f$ are of such width that their index numbers $h$ and $i$ are not covered up by the folds of the map when the latter is folded together, but will always remain visible. The width $o$ of each field of the map is such that the vertical index columns $c$ will also remain visible after the map has been folded together. A preferably alphabetical list of the places on the map, which may be arranged in the form of a small booklet or folder, is removably attached to the inner surface of the cover $e$. In the drawing this list is designated with the letter $p$.

The manner of using the map is as follows:—
The map according to Fig. 1 is first folded along the horizontal crease $g$, the lower half being folded back and up; then it is folded in zig-zag fashion and when completely folded it will appear as shown in Fig. 2, the lower half of the cover $e$ now being at the top. It will be seen at a glance that the individual folds or fields $o$ of the map are so narrow that the index mark columns $c$, $h$, $i$, $k$, $l$, $m$ and $n$ are left free, that is, are not covered up by the folds of the map. If now it is desired to locate, for instance, point $r$ on the map, and we find for this point in the alphabetical list $p$ the index numbers 7/2, then we need only turn over the cover $e$, so that the map will appear as shown in Fig. 3 and point $r$ is then found at the intersection of the lines mentally drawn from index mark 7 and 2. In this case it will be more convenient to use the index column $c$ of the map than the more distant columns $h$ and $i$ of the covers. If on the other hand a point or place nearer the middle of the map is to be found, for instance, point $s$ with the index numbers 3/53, then we must turn over the zig-zag folds until we come to index number 53 in the upper horizontal row, the map being then opened as shown in Fig. 4. In this case we must draw our mental line from one of the vertical columns $h$ or $i$ on the covers.

If it is desired to locate a place on the lower half of the map in Fig. 1, then the folded map as shown in Fig. 2 must be turned through an angle of 180°, so that the lower half of the cover *f* will be at the top, as shown in Fig. 5. To find, for instance, point *t* with the index numbers 14/63, we must then open the map as shown in Fig. 6. In this case the vertical columns *c* of the map will be employed to locate the point, and not the columns of the cover. A place *u* near the middle of the map with the index numbers 12/53 will be found by opening the map as shown in Fig. 7.

From the above it will be obvious that any desired place on the map can be rapidly and easily found without the necessity of spreading the map out, the latter being in all cases simply opened as a book is opened. By this means the use of the map is greatly simplified and at the same time the map itself is subjected to far less wear and tear. These advantages are obtained by the vertical index columns *c, h, i* being arranged so that they are not hidden by the folds of the map.

The vertical index columns *k, l, m, n*, which appear on the outsides of the completely folded map, as shown in Figs. 2 and 5, may be employed with advantage by persons who find it difficult, when locating a place, to draw mental lines from the index numbers to the point of intersection. Such persons can approach one of these columns, for instance, the index column *k*, as near as possible to the point being located, for instance, point *v* with the index numbers 2/43, as shown in Fig. 8, whereby the point of intersection can be very accurately ascertained.

These index columns *k, l, m, n* also facilitate the handling of the map before opening it to locate a place. It is only necessary to turn the folded map so that the vertical column numbers in question appear the right way up, for instance, the number 16 in Fig. 2.

The map according to the present invention is not limited to the form of execution described above and shown in the drawing. As already mentioned, in the case of long maps, the central horizontal crease *g* may be dispensed with and only zig-zag folds employed. In this case the vertical columns *c* on the map can be left away, so that the latter is provided only with the horizontal index rows *b*. The index marks on the margins of the covers *e* and *f* will however be retained on such a map.

Further, the space at the rear of the sheet may be utilized for another map, without in any way departing from the essential idea of the present invention.

What I claim as my invention, is:

1. The combination with a map sheet for use with an index having the positions of localities on the map sheet indicated by vertical and horizontal coordinate indices, said map sheet having a map on one side thereof provided with an index extending vertically at each side edge of the map for the horizontal coordinates, said map sheet being folded along its middle horizontal line to cause the upper and lower back portions to lie against each other, the horizontally folded map sheet being folded on spaced vertical lines alternately in one direction and the other in zig-zag arrangement; of independent cover sheets each attached to a respective side edge of the map sheet and free from each other, each of said cover sheets having on its exposed outer face at one side edge a vertical row of indicia corresponding to the said coordinate indicia of the upper half of the map sheet and having at its other side edge a vertical row of indicia corresponding to the said coordinate indicia of the lower half of the map sheet, the rows of indicia on each back being inverted in respect to each other.

2. The combination with a map sheet for use with an index having the positions of localities on the map sheet indicated by vertical and horizontal coordinate indices, said map sheet having a map on one side thereof provided with an index extending vertically at each side edge of the map for the horizontal coordinates, said map sheet being folded along its middle horizontal line to cause the upper and lower back portions to lie against each other, the horizontally folded map sheet being folded on spaced vertical lines alternately in one direction and the other in zig-zag arrangement; of independent cover sheets each attached to a respective side edge of the map sheet and free from each other, each of said cover sheets having on its exposed outer face at one side edge a vertical row of indicia corresponding to the said coordinate indicia of the upper half of the map sheet and having at its other side edge a vertical row of indicia corresponding to the said coordinate indicia of the lower half of the map sheet, the rows of indicia on the projecting free edge of each back being inverted in respect to each other, the free edge of each cover sheet projecting beyond the folds of the map sheet and having on its inner face a vertical row of indicia corresponding to the said coordinate indicia of the upper half of the map sheet.

ELSE SANWALD.